(12) United States Patent
Hreha et al.

(10) Patent No.: US 6,341,247 B1
(45) Date of Patent: Jan. 22, 2002

(54) ADAPTIVE METHOD TO CONTROL AND OPTIMIZE AIRCRAFT PERFORMANCE

(75) Inventors: Mark A. Hreha, Alton, IL (US); Gerard Schkolnik, Palmdale, CA (US)

(73) Assignee: McDonell Douglas Corporation, Seattle, WA (US)

(*) Notice: Subject to any disclaimer, the term of this patent is extended or adjusted under 35 U.S.C. 154(b) by 0 days.

(21) Appl. No.: 09/465,897

(22) Filed: Dec. 17, 1999

(51) Int. Cl.[7] ............... B64C 9/00; B64C 13/00; G05D 1/00; G05D 3/00; G06F 7/00; G06F 17/00; G06F 19/00

(52) U.S. Cl. ............... 701/3; 701/4; 701/6; 701/7; 701/10; 244/45 R; 244/13; 244/35 R; 244/76 R; 244/36; 244/203; 244/184

(58) Field of Search ................ 701/1, 3, 4, 6, 701/7, 10; 244/45 R, 13, 35 R, 76 R, 36, 203, 184

(56) References Cited

U.S. PATENT DOCUMENTS

| | | | |
|---|---|---|---|
| 5,908,176 A | * 6/1999 | Gilyard | 244/203 |
| 5,961,068 A | * 10/1999 | Wainfan et al. | 244/36 |
| 6,098,923 A | * 8/2000 | Peters, Jr. | 244/45 R |
| 6,102,330 A | * 8/2000 | Burken et al. | 244/76 R |
| 6,173,218 B1 | * 1/2001 | Vian | 701/11 |

OTHER PUBLICATIONS

1994, Mark A. Hreha, Gerard S. et al. "An approach to Aircraft Performance Optimization Using Thrust Vectoring".*

Mark A. Hreha, Gerard S. Schkolnik and John S. Orme, "An Approach To Aircraft Performance Optimization Using Thrust Vectoring".

Gerard S. Schkolnik, John S. Orme and Mark A. Hreha, "Flight Test Validation of A Frequency–Based System Identification Method An An F–15 Aircraft".

* cited by examiner

Primary Examiner—William A. Cuchlinski, Jr.
Assistant Examiner—Ronnie Mancho

(57) ABSTRACT

A measurement-based method to control and optimize the performance of an airborne vehicle. The stability and control of the vehicle is modified to induce a response in the airborne vehicle as reflected by a plurality of response signals. Excitations signals having multi-term sinusoidal waveforms are generated and applied to control signals controlling one or more control effectors. A time domain response of each of the state variables, response signals, and control signals arising from the application of the excitation inputs to the control signals is then measured. These time domain responses are then transformed into frequency domain models. The effectiveness and vehicle stability and control derivatives may then be identified from the frequency domain models of the state variables, response signals, and control signals. These effectiveness derivatives represent the contribution that each of the one or more selected effectors has on a particular performance index of the airborne vehicle and are then used to derive a control effector setting for each of the one or more selected effectors. The selected performance index may then be modified by adjusting the one or more selected effectors to its derived control effector setting. The stability and control derivatives identified may be used to improve the control laws associated with the airborne vehicle.

8 Claims, 3 Drawing Sheets

$e_1 = A_{1,1}\sin(\omega_1 t) + A_{1,2}\sin(\omega_2 t) + ... + A_{1,n}\sin(\omega_n t)$ $e_2 = A_{2,1}\sin(\omega_1 t) + A_{2,2}\sin(\omega_2 t) + ... + A_{2,n}\sin(\omega_n t)$ $e_m = A_{m,1}\sin(\omega_1 t) + A_{m,2}\sin(\omega_2 t) + ... + A_{m,n}\sin(\omega_n t)$

ADAPTIVE METHOD TO CONTROL AND OPTIMIZE AIRCRAFT PERFORMANCE

The United States Government has rights in this invention as provided for by the terms of Contract Number NAS-2-13312 awarded by the National Aeronautics and Space Administration.

FIELD OF THE INVENTION

The present invention relates generally to methods for determining and optimizing the performance characteristics of airborne vehicles and, more particularly, to methods for enhancing the performance of airborne vehicles taking into account environmental conditions and the individual characteristics of the particular vehicle.

BACKGROUND OF THE INVENTION

As is known, conventional airborne vehicles such as aircraft and missiles are structurally designed to provide inherent aerodynamic stability and desirable flight and handling characteristics. Generally, such vehicles employ a conventional manually-operated or automated flight control system, which facilitates control and guidance of the vehicle along a desired flight path. The flight control system controls and guides the airborne vehicle using a number of control surfaces or effectors including stabilators, ailerons, flaperons, spoilers, rudders, propulsion devices, and the like. In addition to controlling and guiding the vehicle along its intended flight path, the flight control system desirably optimizes one or more flight performance parameters, such as, for example, cruise range, range factor, specific excess power, fuel consumption, etc.

In order to accurately control and enhance the performance of airborne vehicles, the stability and control effects that each control surface or effector has on the vehicle must be known. Preferably, such effects must be known for all possible combinations of adjustments and/or positioning of all of the control surfaces and effectors. Additionally, the control and performance would be enhanced if such effects were also known for all types of environmental conditions, (such as, for example, altitude, wind speed and direction, atmospheric pressure and density, and humidity) to which the airborne vehicle may be subjected.

One tool to aid the designer of an airborne vehicle in determining the performance of the vehicle is an analytical, mathematical model of the vehicle and its possible environmental operating conditions. Generally, such models are based on the original design of the airborne vehicle and do not adequately take into account such factors as changes in the structure of the aircraft, which naturally occur over time and use. Additionally, conventional models also cannot adequately predict all possible loading configurations of the vehicle including, for example, passengers, fuel, and stores. It is also difficult to accurately predict all of the possible environmental conditions to which the vehicle may be exposed. As a result, many of the forces and moments to which an airborne vehicle is subjected cannot be accurately determined by purely theoretical calculations and, in many instances, the vehicle designer relies on experimental aerodynamics, such as those obtained using a wind tunnel. As is known, a wind tunnel is an engineering tool whereby the reactions of carefully controlled airstreams on scale models of airplanes, missiles or their component parts can be studied. Using a wind tunnel, the vehicle designers can measure various forces and moments on the aircraft or missile model. These measured forces and moments may then be used to determine specific operating conditions, i.e., control effector settings, for various flight conditions, which are then programmed into the air vehicle's flight control system. These operating conditions may be refined using measured flight test data.

These prior art techniques suffer from significant disadvantages in addition to those previously mentioned. For example, these prior art techniques do not take into account the particular environment in which the airborne vehicle is currently operating. Substantial flight test evaluation would be required to collect data sufficient to represent the variety of atmospheric conditions that may effect a given vehicle. The prior methods also require periodic updating to accommodate vehicle changes over time, such as different weapon loading configurations, structural modifications to the vehicle, or structural defects, such as component misalignment or surface warpage. Additionally, using these approaches, the operating conditions would generally be fine-tuned to only a limited number of prototypical vehicles.

One attempt to improve aircraft performance was undertaken during the development of the Mission Adaptable Wing ("MAW"), which was flight tested on an experimental F-111 military aircraft during the 1980s. The MAW program attempted to improve aircraft performance by making small wing camber adjustments to produce incremental changes in range. The MAW used a discrete gradient measurement process, which had the undesirable effect of amplifying sensed data noise. The use of this measurement process also rendered the approach subject to measurement equipment inaccuracies. Unfortunately, the flight test program for the MAW demonstrated that the planned approach was unsuccessful for most airborne applications primarily because of susceptibility to such measurement noise. Moreover, the MAW program did not take into account the interactive influences that multiple control surfaces and effectors have on specific performance indices.

Accordingly, there is a continuing need for an improved system and method for optimizing airborne vehicle performance. Preferably, the improved method would be capable of identifying, measuring, and optimizing vehicle performance in the presence of varying or unknown atmospheric conditions. Desirably, the improved method would not rely on models but would account for the distinct, individual characteristics of each airborne vehicle, and would automatically accommodate changes to the vehicle over time. The improved method would be beneficial if it incorporated the interactive influences of multiple control surfaces and effectors operating at the same time. A preferred method would also be directly transportable across different configurations and airborne vehicle classes and would not require further development for application to new or revised vehicles.

SUMMARY OF THE INVENTION

The present invention is directed to a method to control and optimize the performance of an airborne vehicle. The method is measurement-based and is implemented for use in real-time. The method computes the influence that particular control effectors have on a specific performance objective. The method identifies the interactive effects of multiple control effectors and then uses the results to optimize the specific performance parameter. The method thus provides a coordinated set of control effector settings that maximize a specific performance objective.

A preferred embodiment of the method of the present invention includes the step of generating and applying excitation inputs to at least one control signal associated with at least one selected effector. The excitation inputs modify the airborne vehicle's state variables (i.e., the stability and control of the aircraft) and induce a response in the airborne vehicle reflected by a plurality of response signals. Preferably, each of the excitation inputs comprises a multi-term sinusoidal waveform, each term uniquely associated with a particular system parameter and having a unique frequency. A time domain response of each of the state variables, response signals, and control signals arising from the application of the excitation inputs to the control effectors is then measured. These time domain responses are then transformed into frequency domain models. The effectiveness derivatives are then identified from the frequency domain models of the response and control signals. These effectiveness derivatives represent the contribution that each of the one or more selected effectors has on a particular performance index of the airborne vehicle and are then used to derive a control effector setting for each of the one or more selected effectors. The selected performance index may then be optimized by adjusting the one or more selected effectors to its derived control effector setting. Additionally, vehicle stability and control derivatives may be identified from the frequency domain models of the state variables and control signals. These stability and control derivatives represent the static and dynamic control effects of the control effectors and may be used to improve the control laws associated with the airborne vehicle.

BRIEF DESCRIPTION OF THE DRAWINGS

To facilitate further discussion of the invention, the following drawings are provided in which.

These drawings are for illustrative purposes only and should not be used to unduly limit the scope of the claims.

DETAILED DESCRIPTION OF THE INVENTION

Figure 1:
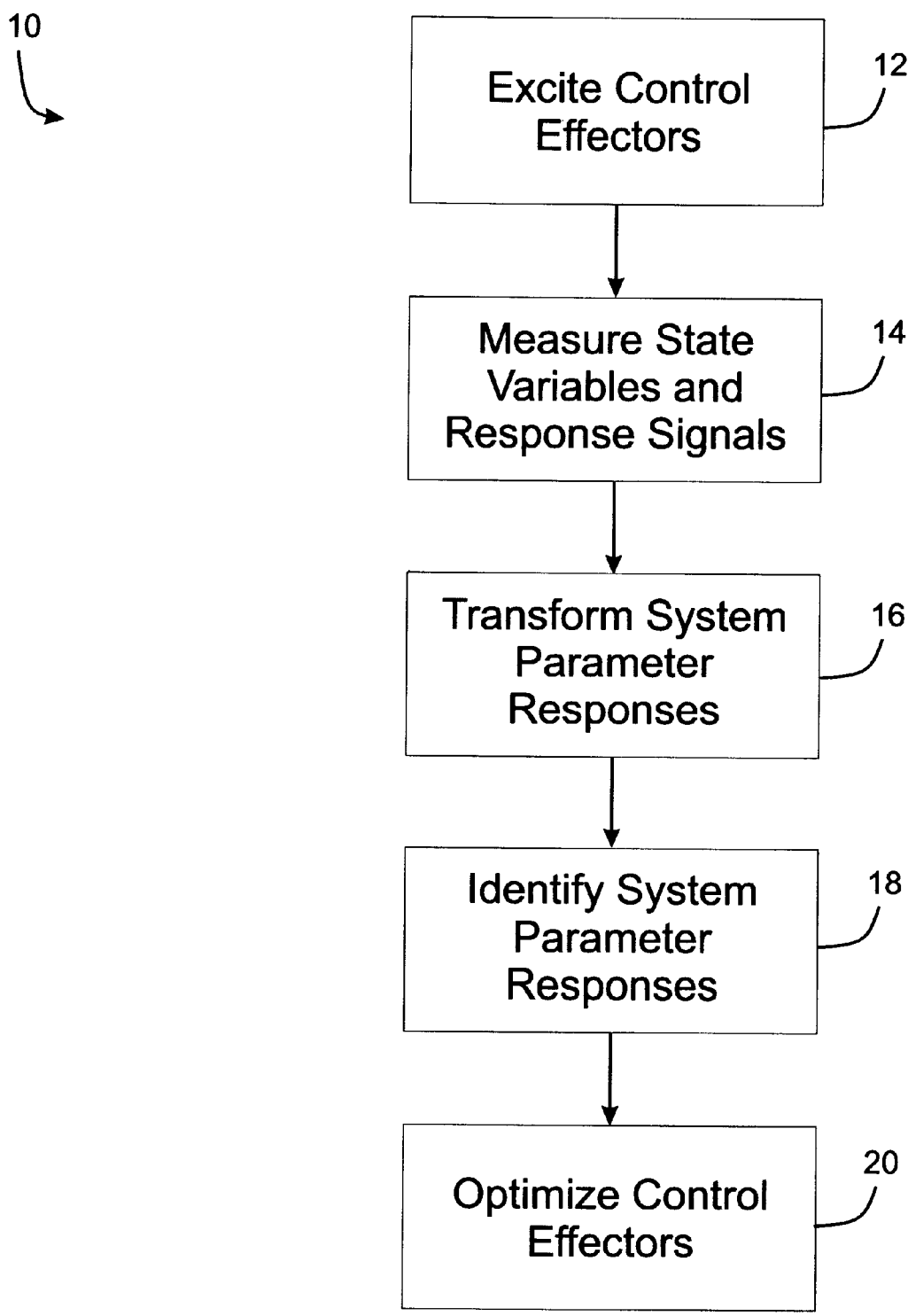
FIG. 1 illustrates the preferred method of the present invention.

Referring now to FIG. 1, therein is illustrated a preferred embodiment of the adaptive aircraft performance method 10 of the present invention. Preferably, the initial step 12 of the process is to excite a predetermined number of the vehicle's various control effectors. The number and variety of control effectors will vary for each particular type of airborne vehicle and may include, for example, elevators, rudders, ailerons, stabilators, flaps, spoilers, speed brakes, engine propulsion effectors (vectoring nozzles, actuated air inlet cowls, etc.), or any other type of control surface or effector that may be moved, operated or changed to effect either the stability or the control of the vehicle. The number and selection of control effectors will depend on the vehicle, the configuration and loading of the vehicle, and the performance objective (i.e., index) of interest. For example, one application of the present invention that will be described herein is determining the effect that two particular effectors on a typical military aircraft (specifically the ailerons and the differential stabilator) have on the stability and control of the aircraft as defined by a number of state variables. Of course, the number and selection of effectors is independent of the present invention.

Figure 2:
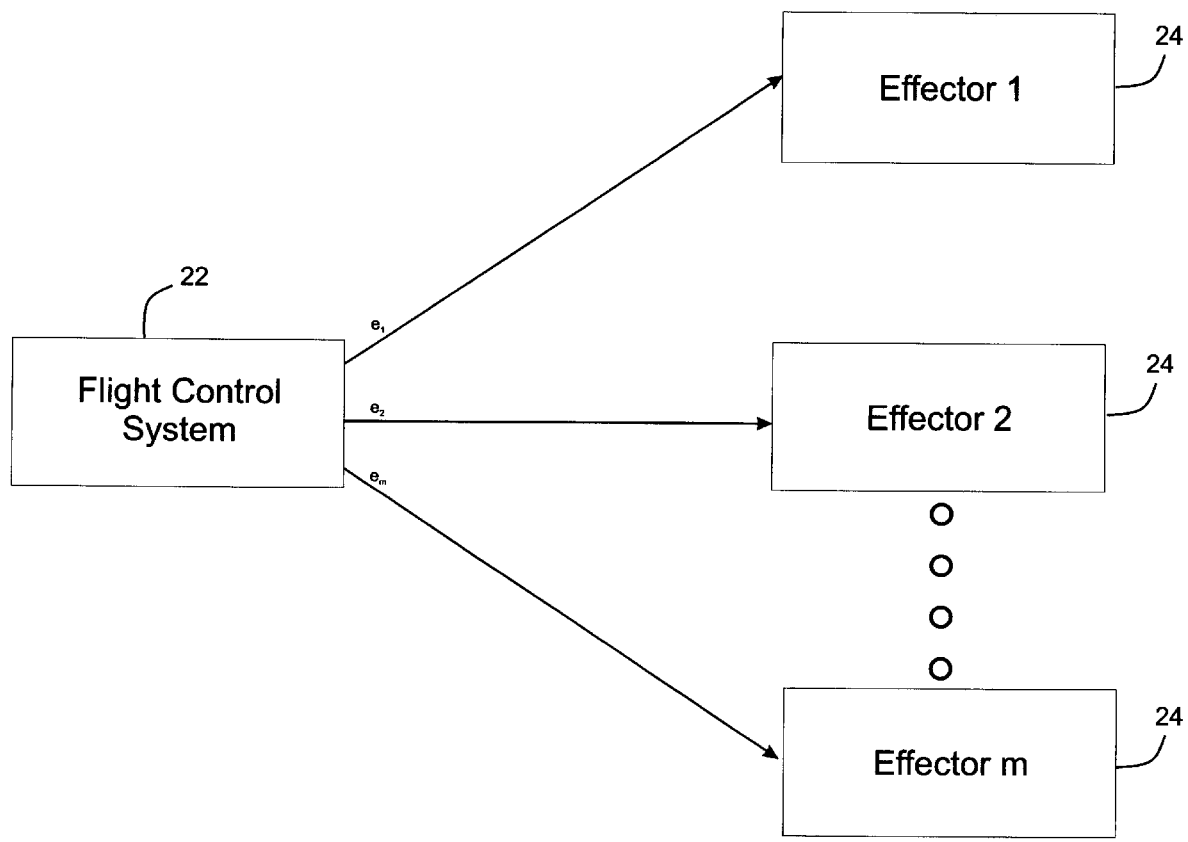
FIG. 2 illustrates the excitation signals of the present invention transmitted from the flight control system to the control effectors.

As is known, each control effector on an airborne vehicle is controlled by an associated signal sent by the vehicle's flight control system. Conventionally, a vehicle's flight control system is designed to produce trajectory changes through appropriate control effector commands and typically includes various electronic devices (e.g., computers), hydraulic devices (e.g., pumps, actuators, etc.) and mechanical devices (e.g., linkages, pushrods, etc.). As shown in greater detail in FIG. 2, excitation signals (represented as $e_i$, where i represents a particular control effector) are generated within the aircraft's flight control system 22 and transmitted to the vehicle's selected control effectors 24. The flight control system will preferably combine the generated excitation signals with its generated commands into control signals and transmit the control signals to the control effectors 24. In the example provided in FIG. 2, two (2) different control signals having associated excitation signals are transmitted to two (2) different effectors 24, for example, the aileron and the differential stabilator. As discussed below, the excitation inputs to the control signals will modify the plurality of state variables and induce a response in the airborne vehicle, which may be characterized by a plurality of response signals.

Preferably, each of the excitation signals is composed of multiple sinusoidal terms with predetermined amplitudes and having distinct frequencies. The amplitudes of each of the sinusoidal terms of a particular excitation signal may be arbitrarily specified. However, a unique frequency is used for each system parameter to be identified, which, as a result of the Discrete Fourier Transform process described below and used to process the response to the excitations, results with the effects of each control effector correlating directly to a discrete frequency bin. Thus, there is a one-to-one correspondence between the number of system parameters being identified and the number of frequency bins. For example, the effects of two control effectors 24 excited at frequencies $\omega_1$ and $\omega_2$ will be characterized by DFT amplitude profiles of the frequency bins identified by integers $n_1$ and $n_2$. A system parameter may be defined as any one of the characteristic parameters of the vehicle's mathematical model, such as pitch, roll or yaw damping coefficient, any static or dynamic stability coefficient, or roll or yaw cross-axis coefficient. Thus, a system parameter may be an effectiveness derivative or a stability and control derivative. The preferred multi-frequency excitation approach of the present invention substantially decreases the amount of time required to accumulate a sufficient amount of measurement data by simultaneously exciting all system parameters, thereby increasing the execution speed of the process. Additionally, because the responses of all of the system parameters to be identified may be measured simultaneously, the mutual interaction effects of the various control effectors may be included into the process to produce a consistent and complete system dynamic model identification.

As a further example of the excitation step, in order to identify n system parameters using m number of control effectors, the excitation signals may be arranged as:

$$e_1 = A_{1,1}\sin(\omega_1 t) + A_{1,2}\sin(\omega_2 t) + \ldots + A_{1,n}\sin(\omega_n t)$$
$$e_2 = A_{2,1}\sin(\omega_1 t) + A_{2,2}\sin(\omega_2 t) + \ldots + A_{2,n}\sin(\omega_n t)$$
$$\vdots$$
$$e_m = A_{m,1}\sin(\omega_1 t) + A_{m,2}\sin(\omega_2 t) + \ldots + A_{m,n}\sin(\omega_n t)$$

where A represents the amplitude, $\omega$ represents frequency, and t represents time. While the amplitudes of the excitation signals may be arbitrary, they are physically bounded by the possible range of motion of each effector and practically bounded by how much disturbance the excitation should be permitted to have on the vehicle. Typically, the amplitudes will be such that the control surfaces and effectors are deflected about an additional one or two degrees. Preferably, the frequencies used are distinct and adequately separated, such as by the following:

$\omega_j = 2\pi/N_{DFT}(\Delta T)(n_j)$ where $N_{DFT}$ represents the number of Discrete Fourier Transform points;

$\Delta T$ represents the sample rate;

j represents a particular control effector; and $n_j$ represents the system parameter identification integer Flight tests conducted to verify the functionality of the present method revealed that $n_j$ must be a prime number (i.e., 2, 3, 5, 7, 11, etc.). As the present method relies on frequencies to carry information and on frequency uniqueness to separate multiple effector influences via a Discrete Fourier Transform process, the use of prime numbers in the above equation to defined the appropriate spacing of the frequencies is necessary. This prevents data coalescence (i.e., the folding of information from one frequency onto different frequencies). Without the use of such prime numbers, it is difficult, if not impossible, to separate the collected information and determine from which effector it originated. Prime numbers comprise a mathematical set in which no number is a multiple of any other in the set. When used to determine the excitation frequencies via the above equation, prime numbers eliminate the possibility that any one frequency will be a multiple of any other (i.e., there will be no sub-harmonics in the selected frequency range). Elimination of sub-harmonics enables separation and isolation of each control effector's effectiveness even though the measurement data contains effects from other mutually-interacting, simultaneously-actuating control effectors.

Simultaneously with exciting the control effectors, as shown in step 14 of FIG. 1, the various dynamic state variables and system response signals are measured. Additionally, the system control variables (which ideally represent the control signals sent from the flight control system to each of the control effectors, including the excitation inputs) are measured in order to determine the actual operation or movement of each particular control effector. This is necessary because feedback control systems generally introduce the frequency content of one effector into all other effectors. However, use of the unique frequency specification method disclosed herein prevents contamination of the measured data. Measurement of the control signals quantifies the alteration of the energy input to each effector by the flight control system at the particular frequencies. The control measurements may be obtained from the associated actuator positions, which are fed back to the flight control computer. The measured state variables may include angle of attack, pitch attitude, roll attitude, pitch rate, roll rate, yaw rate, side slip angle, speed, and mach number available from conventional flight control sensors. The number of dynamic state variables analyzed using the present method is not limited. The measured response signals may include normal acceleration, lateral acceleration, axial acceleration, pitch acceleration, roll acceleration, and yaw acceleration. Preferably, the state variables, control signals, and response signals are measured for a time period sufficient to receive and capture data for a number of operational cycles, for example, at least three cycles. Depending on the particular system parameters being identified, the time to capture data for a sufficient number of cycles may extend for about between 2 and 30 seconds (which roughly equates to between three and five full cycles of excitation). The state variables and response signals may be measured using conventionally available flight equipment, such as various gyroscopes, accelerometers, fuel flow meters, flight instruments, and the like. The state variables, response signals, and control signals are preferably measured in the time domain.

Figure 3:
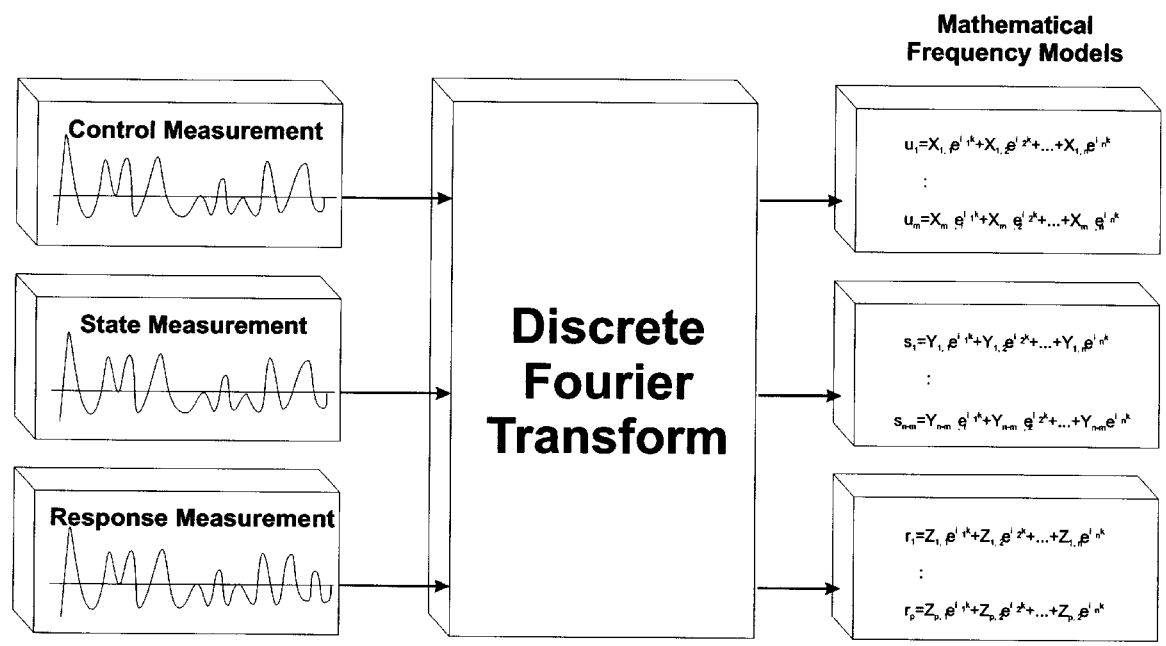
FIG. 3 illustrates the transform of various measurements from the time domain into the frequency domain used in the present invention.

The next step in the preferred process is to transform the measured control signals, dynamic state variables, and response signals from the measured time domain into the frequency domain (step 16 on FIG. 1). A preferred approach is to transform these measurements using a conventional Discrete Fourier Transform process, as illustrated in FIG. 3, to convert the measurements to a series of mathematical frequency models. Of course, those skilled in the art will appreciate that other transformation approaches may be used, provided that such approaches have the ability to decompose amplitude and frequency characteristics from the measured control signals, dynamic state variables, and response signals. The Discrete Fourier Transform process is a well-known, efficient analytical decomposition of an arbitrary signal into a linear series of sinusoidal terms. The process computes the amplitudes of the sine terms across a specified frequency band to reproduce the measured signal. The amplitudes indicate the energy level (effectiveness in this invention) corresponding to each discrete frequency exhibited by the original signal. The distinct frequencies are the carrier agents in this invention and the associated amplitudes represent transmitted information.

Next, the coefficients of the conventional force and moment model equations are identified (step 18 in FIG. 1). These coefficients represent the effectiveness and vehicle stability and control derivatives, i.e., the contribution that each of the one or more selected control effectors has on a particular performance index. The series of mathematical frequency models may be represented in matrix form as (where u represents system control signals, s represents the dynamic state variables, and r represents the system response signals):

$$\begin{bmatrix} u_1 \\ \vdots \\ u_m \end{bmatrix} = \begin{bmatrix} X_{1,1} & \cdots & X_{1,n} \\ \vdots & \ddots & \vdots \\ X_{m,1} & \cdots & X_{m,n} \end{bmatrix} \begin{bmatrix} e^{i\omega_1 k} \\ \vdots \\ e^{i\omega_n k} \end{bmatrix}$$

$$[u] = [X][e]$$

$$\begin{bmatrix} s_1 \\ \vdots \\ s_{n-m} \end{bmatrix} = \begin{bmatrix} Y_{1,1} & \cdots & Y_{1,n} \\ \vdots & \ddots & \vdots \\ Y_{n-m,1} & \cdots & Y_{n-m,n} \end{bmatrix} \begin{bmatrix} e^{i\omega_1 k} \\ \vdots \\ e^{i\omega_n k} \end{bmatrix}$$

$$[s] = [Y][e]$$

$$\begin{bmatrix} r_1 \\ \vdots \\ r_p \end{bmatrix} = \begin{bmatrix} Z_{1,1} & \cdots & Z_{1,n} \\ \vdots & \ddots & \vdots \\ Z_{p,1} & \cdots & Z_{p,n} \end{bmatrix} \begin{bmatrix} e^{i\omega_1 k} \\ \vdots \\ e^{i\omega_n k} \end{bmatrix}$$

$$[r] = [Z][e]$$

Using these matrices, a state space mapping equation, which represents the multi-dimensional frequency vector, may be developed by combining the system control variable equations ([u]) and the system parameter equations [s] and solving for the frequency vector [e] as follows:

$$\begin{bmatrix} s \\ u \end{bmatrix} = \begin{bmatrix} Y \\ X \end{bmatrix}[e] \Rightarrow [e] = \begin{bmatrix} Y \\ X \end{bmatrix}^{-1} \begin{bmatrix} s \\ u \end{bmatrix}$$

The matrix inversion operation implies that the composite matrix $[Y\ X]^T$ is square and nonsingular. The frequency vector [e] may then be substituted into the system response variable equation [r], which results in:

$$[r] = [Z]\begin{bmatrix} Y \\ X \end{bmatrix}^{-1} \begin{bmatrix} s \\ u \end{bmatrix} = [\Lambda]\begin{bmatrix} s \\ u \end{bmatrix}.$$

The matrix [Λ] is a matrix of effectiveness and stability and control coefficients (derivatives) representing each of the system parameters, which are components of the conventional force and moment model equations. For example, the equations representing the roll moment and the yaw moment of the airborne vehicle as a function of certain contributors (including side slip angle, roll rate, yaw rate, and two effectors (e.g., the ailerons and the differential stabilator)) may be expressed as:

Roll moment: $C_l = \dfrac{L}{\bar{q}Sb} = \dfrac{I_x p}{\bar{q}Sb} = C_{l_\beta}\beta + C_{l_p}p + C_{l_r}r + C_{l_{\delta_1}}\delta_1 + C_{l_{\delta_2}}\delta_2$ Roll moment:

Yaw Moment: $C_n =$ $\dfrac{N}{\bar{q}Sb} = \dfrac{I_z \dot{r}}{\bar{q}Sb} = C_{n_\beta}\beta + C_{n_p}p + C_{n_r}r + C_{n_{\delta_1}}\delta_1 + C_{n_{\delta_2}}\delta_2$ Yaw Moment:

where β represents side slip angle, p represents roll rate, r represents yaw rate, $\delta_1$ represents the first effector (e.g., the ailerons) and $\delta_2$ represents the second effector (e.g., the differential stabilator). The determination of the coefficients associated with each of these parameters requires a unique frequency. Thus, in this example, the effectors must be exercised using at least five different frequencies in the initial step 12 of the process.

Each of the coefficients in the above equations represents a particular stability or control derivative, e.g., $C_{lp}$ is the roll damping coefficient, and $C_{nr}$ is the yaw damping coefficient. In the above example, the five unknown coefficients in each moment coefficient equation may be solved using the results of the transform process.

These force and moment equations may be expressed in general terms of the dynamic state variables (s), control effector variables (u), and system response variables (r) as follows:

$r_1 = C_{1_s1}s_1 + C_{1_s2}s_2 + \ldots + C_{1_u1}u_1 + C_{1_u2}u_2 + \ldots$ $r_2 = C_{2_s1}s_1 + C_{2_s2}s^2 + \ldots + C_{2_u1}u_1 + C_{2_u2}u_2 + \ldots$ These may then be written in matrix form as:

$$\begin{bmatrix} r_1 \\ r_2 \end{bmatrix} = \begin{bmatrix} C_{1_s} & C_{1_u} \\ C_{2_s} & C_{2_u} \end{bmatrix} \begin{bmatrix} s \\ u \end{bmatrix}$$

The coefficients may then be expressed as:

$$[C_s\ \ C_u] = [z]\begin{bmatrix} Y \\ X \end{bmatrix}^{-1}$$

Thus, at this step in the method, the system response due to a predetermined number of effectors is known. For example, the solution for the effective roll moment as a result of exercising both the ailerons and the horizontal stabilator simultaneously is provided and may be used, in real-time, to design control laws applicable for this particular airborne vehicle and at the particular environmental conditions.

In addition to identifying aircraft stability and control derivatives, the present invention may be used to determine and optimize specific aircraft performance functions (step 20 in FIG. 1). The process may be used to determine the relationship multiple control effectors have on a specific performance index. Such performance indices may be, for example, range factor, cruise factor, fuel efficiency, drag, specific excess power, etc. For example, one application may be to maximize range factor by re-trimming certain control effectors (e.g., stabilators and ailerons) without changing the normal acceleration (i.e., trajectory) of the air vehicle. The presently defined method is used to identify the effectiveness derivatives of the air vehicle, which represent the contribution that each selected effector has on a particular system parameter, e.g., range factor. Thus, each effectiveness derivative represents how much range improvement one would achieve by moving the associated control effector by a particular amount, e.g., one degree. Knowing these derivatives, control laws may be designed, improved, and/or optimized to derive the best setting for each control effector. These settings will then modify the particular performance index chosen. The optimization may be a direct application of linear programming to analytical functions composed of the identified parameters. The specific problem statement may be:

$$\max_{\delta u_j} \sum_{j=1}^{m} A_{u_j}\delta u_j \text{ subject to } \sum_{j=1}^{m} B_{u_j}\delta u_j \text{ and } \delta u_{j_{min}} \leq \delta u_j \leq \delta u_{j_{max}}$$

The solution of this linear programming problem, which may be readily determined by those skilled in the art, results in a set of control effector settings that optimize a particular performance index, i.e., range factor. Of course, higher order performance functions, for example, quadratics, cubics, etc., may be used in lieu of the linear programming approach. For example, see Hreha, Mark A., Schkolnik, Gerard S., and Orme, John S., "*An Approach to Aircraft Performance Optimization Using Thrust Vectoring*" AIAA Paper 94-3361, which describes a parabolic performance index approach. This article is incorporated herein for all purposes.

The method of the present invention was flight tested on the Advanced Control Technology for Integrated Vehicles (ACTIVE) F-15 aircraft. The specific performance index selected for optimization during this flight test program was specific excess power (i.e., reduce the aircraft's axial drag). Optimization solutions were obtained for three control effector configurations: (1) pitch vectoring nozzle and stabilator; (2) pitch vectoring nozzle, stabilator, and canard, and (3) pitch vectoring nozzle, stabilator, canard, and aileron. Several different tests were conducted for each of these three effector configurations to obtain statistical databases.

By way of demonstrating of the usefulness and accuracy of the present method, the following table presents a statistical analysis of the applicant's method's identification of the effect that each control effector has on the normal acceleration, wherein the mean values represent the average positive normal acceleration generated for one degree of negative control effector deflection (the control effects on normal acceleration is an important component of the specific excess power optimization solution):

|  | 2 Effector Configuration | | 3 Effector Configuration | | 4 Effector Configuration | |
| --- | --- | --- | --- | --- | --- | --- |
|  | Mean | Standard Deviation | Mean | Standard Deviation | Mean | Standard Deviation |
| Stabilator | −0.719 | 0.025 | −0.730 | 0.044 | −0.732 | 0.026 |
| Pitch Nozzle | −0.109 | 0.006 | −0.092 | 0.010 | −0.112 | 0.011 |
| Canard | — | — | +0.309 | 0.019 | +0.306 | 0.019 |
| Aileron | — | — | — | — | −0.067 | 0.006 |

The near identical results for the computed mean values of each control effector for the different configurations illustrates that the present invention is capable of producing accurate results even if the number of effectors exercised varies. Moreover, the low standard deviation values demonstrate the method's inherent capability to operate effectively with variances in measured data that are customary in this field. The small standard deviation means that the method consistently identified the solution even though the air vehicle and its operating and environmental conditions of flight were changing during the test.

As part of this flight test, the method of the present invention was used to optimize the supersonic cruise performance of the ACTIVE F-15 aircraft. The optimization resulted in an increase in specific excess power of 32 feet per second (which represents about a five percent reduction in drag) relative to the normal (i.e., unoptimized configuration). The converged optimal trim solution (i.e., the changes in control effector settings from nominal) computed by the optimization process are shown below:

| Stabilator Deflection | Pitch Vector Nozzle Deflection | Canard Deflection | Aileron Deflection |
| --- | --- | --- | --- |
| 2.20 Trailing Edge Up | 5.8° Trailing Edge Down | 6° Trailing Edge Down | 10° Trailing Edge Up |

This optimal solution indicates that the total drag reduction benefit is achieved by reducing the local trim drag of the stabilator and using the three other control surfaces to restore flight condition trim. This optimization was developed by the method of the present invention by simultaneously taking into account all four control effectors along with their mutual interactions. While this optimization was specifically achieved using a particular aircraft in a particular flight condition (i.e., supersonic), those skilled in the art will appreciate that the performance of other airborne vehicles in other flight conditions may similarly be optimized. As the present method operates in real-time and is independent of any particular air vehicle or flight condition, the method allows optimization of other air vehicles without the customary attendant cost and time investment required to accumulate data, build models, or develop and implement databases.

The method of the present invention may preferably be implemented in software and incorporated as part of the process executing with the vehicle's flight control computer (or its equivalent). The preferred method may be continuously executed within the flight control computer or it may be executed as necessary to periodically improve performance. For example, the method may be repeated to continually improve upon the airborne vehicle's trim condition until a measurable maximum is reached or until the physical limits of the control effector(s) are encountered. Use of the presently preferred method substantially reduces the post-flight engineering effort typically required to analyze large amounts of flight test data by essentially performing this function in real-time aboard the air vehicle. The method determines the aerodynamic stability and control derivatives necessary for flight control system development and refinement.

Although the present invention has been described in considerable detail with reference to certain preferred versions thereof, other versions are possible without departing from the spirit and scope of the present invention. Therefore the spirit and scope of the appended claims should not be limited to the description of the preferred embodiments described herein.

What is claimed is:

1. A method to modify a performance index of an airborne vehicle having a plurality of control effectors, each control effector controlled by an associated control signal, the stability of the vehicle defined by a plurality of state variables, the method comprising the steps of:

(a) generating and applying excitation inputs to at least one control signal associated with at least one selected effector chosen from the plurality of control effectors to modify the plurality of state variables and induce a response in the airborne vehicle reflected by a plurality of response signals, wherein each of the excitation inputs comprises a multi-term sinusoidal waveform, each term uniquely associated with a particular system parameter and having a unique frequency selected such that each frequency is not a multiple of any other frequency;

(b) measuring a time domain response of each of the state variables, response signals, and control signals at a sampling rate, the time domain responses arising from the application of the excitation inputs to the control signals;

(c) transforming the measured time domain responses of the state variables, response signals, and control signals into frequency domain models;

(d) identifying effectiveness derivatives from the frequency domain models of the response signals and the control signals, the effectiveness derivatives representing the contribution that each of the one or more selected effectors has on a particular performance index;

(e) deriving a control effector setting for each of the one or more selected effectors based on the effectiveness derivatives; and (f) modifying the performance index by adjusting the one or more selected effectors to its derived control effector setting.

2. The method of claim 1 wherein each unique frequency ($\omega$) is selected according to the equation:

$$\omega_j = 2\pi/N_{DFT}(\Delta T)(n_j),$$

where $N_{DFT}$ represents a number of Discrete Fourier Transform points;

ΔT represents the sampling rate;

j represents a particular control effector; and $n_j$ represents a prime number assigned to each system parameter.

3. The method of claim 1 further comprising the step of identifying vehicle stability and control derivatives from the frequency domain models of the state variables and control signals, the stability and control derivatives representing the static and dynamic control effects of the control effectors, wherein such vehicle stability and control derivatives may be used to improve control laws associated with the airborne vehicle.

4. The method of claim 3 wherein the step of measuring a time domain response of each of the state variables, response signals, and control signals comprises the step of measuring the time domain response for a time period sufficient to measure the state variables, response signals, and control signals of between three and five cycles of excitation.

5. The method of claim 3 wherein the step of transforming the measured time domain responses of the state variables, response signals, and control signals into frequency domain models comprises the step of using a Discrete Fourier Transform process.

6. The method of claim 1 wherein the performance index is selected from the group consisting of range factor, cruise factor, fuel efficiency, drag, and specific excess power.

7. The method of claim 1 wherein the plurality of state variables is selected from the group consisting of angle of attack, pitch attitude, roll attitude, pitch rate, roll rate, yaw rate, slid slip angle, speed, and mach number.

8. The method of claim 1 wherein the step of deriving a control effector setting comprises the step of applying linear programming techniques to the effectiveness derivatives.

* * * * *